Nov. 15, 1966     H. W. BOOTHROYD     3,285,076
RATE GYRO NULL SHIFT ELIMINATOR
Filed Sept. 15, 1961     2 Sheets-Sheet 1
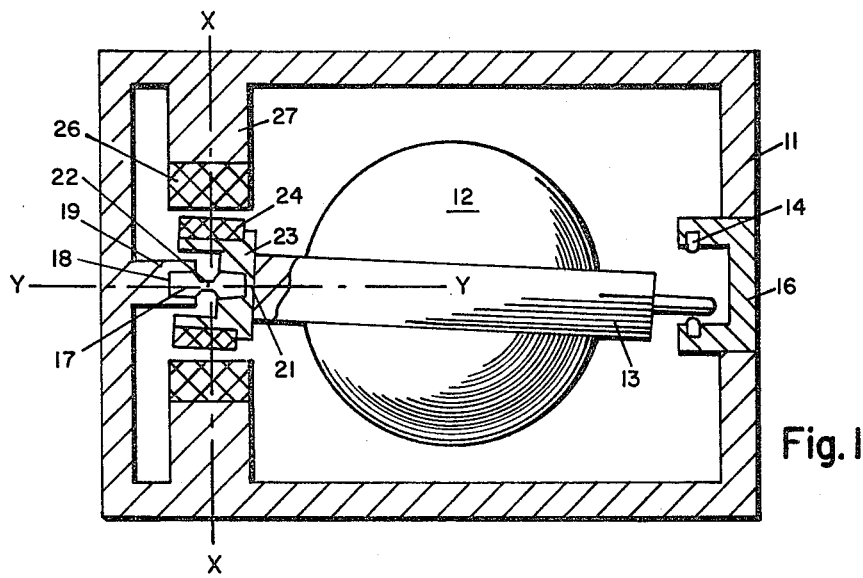
Fig. 1
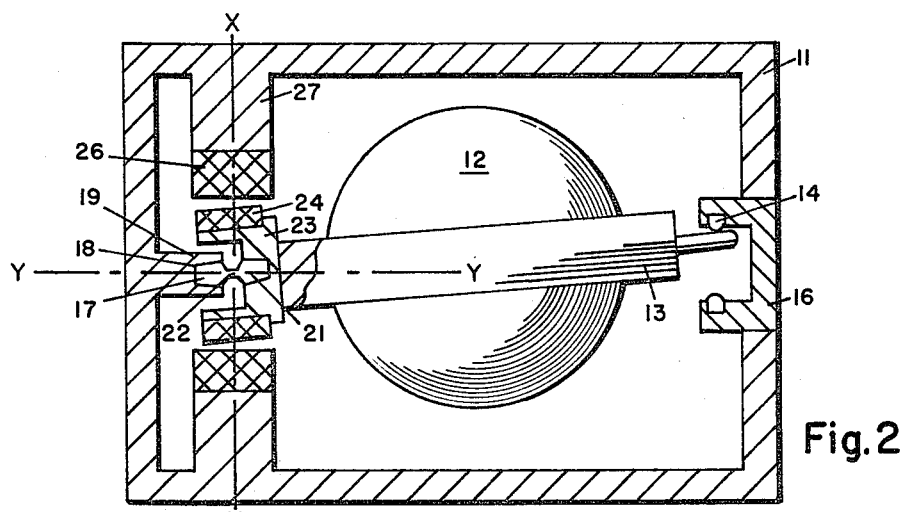
Fig. 2
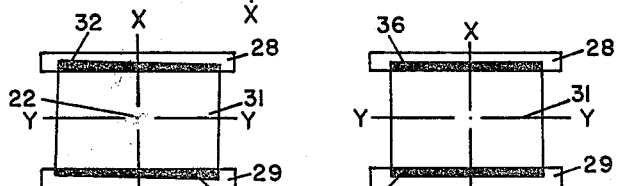
Fig. 3
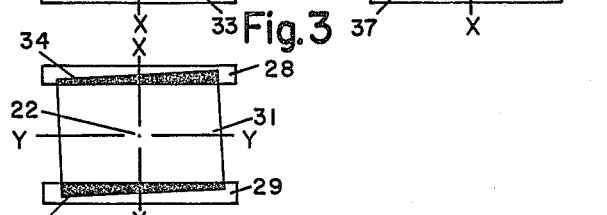
Fig. 4
Fig. 5
Howard W. Boothroyd
*INVENTOR*

Nov. 15, 1966  H. W. BOOTHROYD  3,285,076
RATE GYRO NULL SHIFT ELIMINATOR
Filed Sept. 15, 1961  2 Sheets-Sheet 2

Howard W. Boothroyd
*INVENTOR*

3,285,076
RATE GYRO NULL SHIFT ELIMINATOR
Howard W. Boothroyd, Amherst, N.H., assignor to Sanders Associates, Inc., Nashua, N.H., a corporation of Delaware
Filed Sept. 15, 1961, Ser. No. 138,318
5 Claims. (Cl. 74—5.6)

This invention relates to a rate gyro pickoff arrangement.

More particularly this invention relates to a rate gyro pickoff and an interrelated torsion bar and jewel bearing support.

A continuing problem has persisted to plague the rate gyro industry in that the pickoff arrangements constantly give out a small variable error signal due to the actual physical transverse shifting of the pickoff rotor. This physical shifting arises because of the inherent impossibility of perfecting jewel bearings without some degree of physical play. While it should be noted that this physical play is extremely small, the precision of the gyro pickoff is such that any transverse movement of the pickoff rotor with respect to the stator produces a spurious signal.

In the past the producers of rate gyros have contented themselves with spreading the error signal out over a large range of test "G" forces to reduce the value of this error signal per "G." In other words, the greater the test "G" force the lesser the amount of error per "G." This manipulation of figures, however, fails to remove the basic error signal, which has essentially the same value for one "G" as it has for say 10 "G's."

In advancing the state of the art, the invention herein presented completely removes the "G" force error signal by the unobvious and unique location of the rate gyro torsion rod and interrelated pickoff rotor arrangement, so that the torsion rod's central point of flexure coincides with the pickoff rotor's geometric center.

It is, therefore, an object of this invention to eliminate the gravity sensitive null shift in a rate gyro.

A further object of this invention is to provide a pickoff rotor element whose transverse movement is limited to a pivotal motion about its geometrical center.

A still further object of this invention is to provide a torsion rod support which has a central point of flexure coincident with the pickoff rotor geometrical center point.

Yet another object of this invention is to position a pickoff rotor element within a surrounding pickoff stator element to thereby permit the effective balanced cancellation of electrical signals caused by transverse movement of the inner rotor pickoff member.

Another object of this invention is to provide a torsion rod support system which does not require extremely precise cooperative bearing structure.

FIGURE 1 shows a cross section of a rate gyro embodying the present invention which also depicts exaggerated gimbal end play at the jewel bearing.

FIGURE 2 shows a cross section of a rate gyro embodying the present invention which also depicts exaggerated gimbal end play at the jewel bearing in a direction opposite to that illustrated in FIGURE 1.

FIGURE 3 illustrates a schematic representation of the interaction of the rotor and stator inductive fields when the gimbal is in the position shown in FIGURE 1.

FIGURE 4 illustrates a schematic representation of the interaction of the rotor and stator inductive fields when the gimbal is in the position shown in FIGURE 2.

FIGURE 5 illustrates a schematic of the type shown in FIGURE 3 and FIGURE 4 when the gimbal is in a transitory position between that which is depicted in FIGURE 1 and FIGURE 2.

Figure 6:
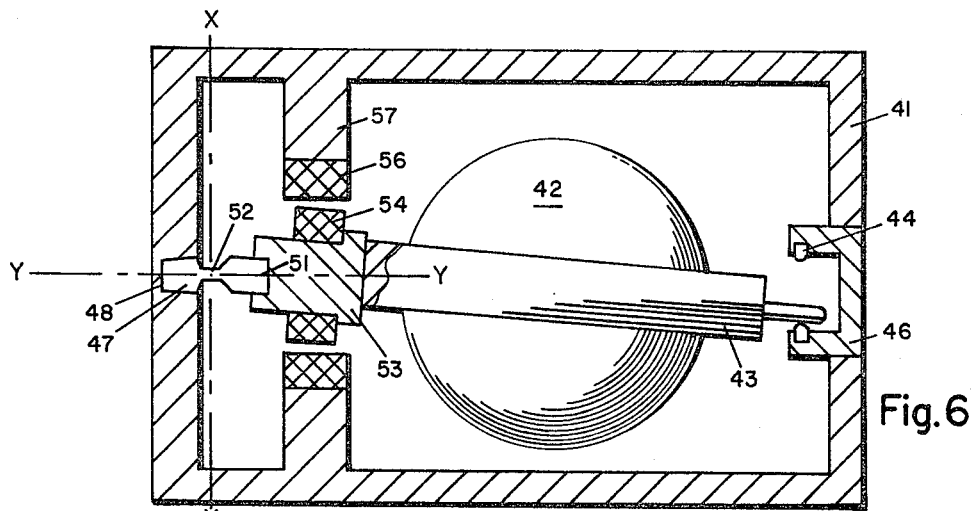
FIGURE 6 shows a cross section of a typical prior art rate gyro suspension system and depicts exaggerated gimbal end play.

The basic problem area with which this invention is involved deals with the elimination of a gravity sensitive null shift in a rate gyro having for gimbal suspension a torsion rod near the pickoff end and a jewel bearing at the other end. The current designs of rate gyros which include the conventional torsion bar as the gimbal torsional restraint member, have the torsion bar located at a convenient point in the design of a gyro but without consideration of its location with respect to the pickoff rotor of the gyro unit. In these types of gyro's another end of the gyro's gimbal structure is supported in a jewel bearing. While these jewel bearings are of a very precise nature in their dimensions, there is inherently a very small amount of play that resides in any fit of this particular nature. As a matter of fact, the transverse motion is on the order of 35 millionths of an inch. While this in and of itself would appear to be an almost negligible amount of movement, the pickoffs in these rate gyros are so extremely sensitive to any and all movements, that this small shift in the jewel bearing, due to the forces of gravity on the gimbal and its associate rotor, causes a change in the flux fields that cooperate with the rotor and the stator of the pickoff and thereby produces a signal. This signal, as noted above, is due to the disturbance of the electro-magnetic flux patterns that are present between the respective teeth of the pickoff rotor and the stator.

In order that one may determine whether this problem of gravity sensitive null shift is present, the gyro must undergo a series of static balance tests. These tests involve the rotation of the entire gyro unit through 360° about its output axis and recording the pickoff output during the entire rotation of the unit.

In an ideal or in a theoretically perfect unit, the output should be balanced and should be constant throughout the 360° rotation. This constant output is termed the null voltage and represents the minimum ever attainable by the unit. It is of absolute importance that this minimum null voltage be maintained constant regardless of gyro position with respect to gravity. (The gimbal suspension is such that the torsion rod is structurally incapable of supporting the gimbal as a cantilever as the force of gravity acts on the gimbal and cooperating with the torsion rod is a jewel bearing at the opposite end which structure becomes a beam fixed at one end by the torsion rod and freely supported at the opposite end by a jewel bearing. The torsion rod then acts as a universal or hinge joint.) The pivot pin, which is at the other end of the gyro gimbal, always rests against the jewel bearing and its clearance in the jewel bearing determines the total hinging action noted above.

From simple lever proportions, the 35 millionths of an inch transverse motion in the jewel produces 4.1 millionths of an inch transverse motion at the pickoff rotor, the point of zero transverse motion being at the hinge joint or weakest part of the torsion rod.

Conventionally, a minimum null voltage is obtained by adjusting the rotor of the pickoff rotationally with respect to the stator which is mounted in the gyro casing. Under the null condition, the poles of the rotor produce a net torque equal to zero or a position of equilibrium. If after nulling, the physical relationship of the rotor and the stator is changed to alter the flux coupling therebetween, it will be accompanied by a net torque and this torque causes a minute rotational deflection of the rotor, which results in the reaching of a new equilibrium position. At the new equilibrium position a new null voltage exists, this is termed tthe gravity sensitive null shift, and the signal there produced is commonly referred to as the W signal. It is this signal which the present invention has been created to remove.

Referring now to FIGURE 1, there is shown a gyro housing 11. Mounted in the gyro housing for oscillatory movement is a gimbal 13 which has mounted therein a gyro rotor 12. One end of the gimbal 13 rests in a jewel bearing 14 which in turn is connected by a jewel bearing support 16 to the housing 11. It is important to note at this time that the fantastically exaggerated tolerance depicted in the jewel bearing has been so placed in the drawing to emphasize the fact that there is a very minute transverse movement within the jewel bearing. Because the movement would be so small that it would be impossible to detect with the eye, these figures have been drawn such that the movement is greatly exaggerated and it is believed it will aid in an understanding of the basic problem involved and the unique solution presented herein.

The other end of the gimbal 13 has mounted thereon a torsion rod 17 which has one end 18 mounted in a torsion rod support extension 19 which is integral with the gyro housing 11. The other end of the torsion rod 21 is secured to the gimbal 13 and an interconnected pickoff rotor support 23. Mounted on the pickoff rotor support is a pickoff rotor 24. Cooperating with this pickoff rotor 24 is a pickoff stator schematically indicated at 26. The pickoff stator 26 is in turn integrally connected to a stator support 27 which in turn forms part of the housing 11.

Of specific interest is the central portion of the torsion rod 17 which is of reduced diameter and as can be seen theer is a central point of flexure 22 which coincides with the geometrical center of the gyro pickoff rotor and the pickoff stator 26. For purposes of better understanding the movement of the gimbal 13, there have been placed on the drawing a transverse axis X and the intersecting axis Y which axis Y represents the output axis of the gyro unit. The axis X passes through and intersects the axis Y at the central point of flexure of the torsion rod 17, and the axis X also passes through the geometrical center of the pickoff rotor. As it can be seen, when the gyro unit is in its first test position depicted by FIGURE 1, the gyro gimbal 13 has fallen due to the force of gravity acting on the gimbal and its related rotor 12. This movement has caused the entire gimbal and related rotor structure to pivot or hinge about the central point of flexure 22.

Referring now to FIGURE 2, there will be seen the same or rather similar configuration depicted in FIGURE 1, wherein the force of gravity has acted in the other direction when, for example, the unit is placed in a second test position. Here it will be noted that the pickoff rotor has assumed a new position. It will of course be understood that as the gyro shifts from position to position during testing or in actual use, as the gyro is rotated through 360° for test purposes, there will be a continual change in the interaction of the flux patterns between pickoff stator 26 and the pickoff rotor 24. It is this change in flux linkage that produces a signal, ideally the signal to be produced should be made as close to zero as possible. Herein lies the unique arrangement provided for by this invention. Because the central point of flexure is such that the pickoff rotor member tends to rock or oscillate about the geometrical center point 22, the induced inductive voltages will inherently tend to cancel themselves out without generating an accompanying torque.

Referring now to FIGURES 3, 4 and 5, there is disclosed and depicted the interaction of the inductive fields of the gyro pickoff rotor 24 and the gyro stator element 26. The pickoff rotor inductive field for example, of one pole member is schematically indicated by the box 31 in all of the figures. The respective inductive fields of the stator 26 have been schematically indicated as rectangular boxes 28 and 29 in all of these figures. It will be noted that in FIGURE 3, for example, the inductive field 31 of the pickoff rotor 24 overlaps the fields 28 and 29 of the stator pickoff arrangement 26. A study of these figures discloses that the areas 32 and 33 are exactly equal to each other and equal to areas 28 and 29 of FIGURE 5 and these areas where the flux fields of the stator and the rotor meet produce the signals which are indicative of the rotor's relative position to the stator. It will be noted here that the signals produced by the coaction or interaction of the field 31 with the stator field 28 represented by darkened area 32 is exactly of the same physical dimension as that area 33 which the field 31 of the pickoff rotor 24 and the stator field 29 have produced. It is this very fact that the areas 32 and 33 are exactly equal to each other that provides for the particular position a zero net signal change from the pickoff rotor arrangement.

Referring now to FIGURE 4, wherein there is depicted the schematic representation of the flux patterns of the pickoff rotor 24 and the stator 26 when the gimbal arrangement depicted in FIGURE 2 is under the force of gravity which moves the gimbal exactly opposite to that shown in FIGURE 1. Again it will be noted that there are two areas 34 and 35 which are of exactly the same dimension and again it is this fact that permits the gyro arrangement that embodies the currently described invention to produce a zero signal change.

Referring now to FIGURE 5, wherein there is depicted the ideal position which is rarely attainable in gyro production that is, where the inductive fields 31 of the gyro rotor pickoff and the stator fields 28 and 29 so coact that the areas of coaction are exactly equal.

Referring now to the theoretical operation of FIGURES 3, 4 and 5, it will be noted that the induced electromagnetic field of the flux pattern produced by the gyro pickoff rotor 24 is schematically represented as darkened areas and must be due to the very fact that the torsion rod is situated such that its central point of flexure 22 is at exactly the geometrical center of the gyro pickoff rotor and pickoff stator arrangement. The box 31 tends to oscillate or move back and forth in a purely rotational rocking motion about the center point 22. This inherently causes the areas of flux pattern interaction between the stator and the rotor to equal themselves out on either side of the pickoff rotor arrangement regardless of gyro rotational position.

Figure 7:
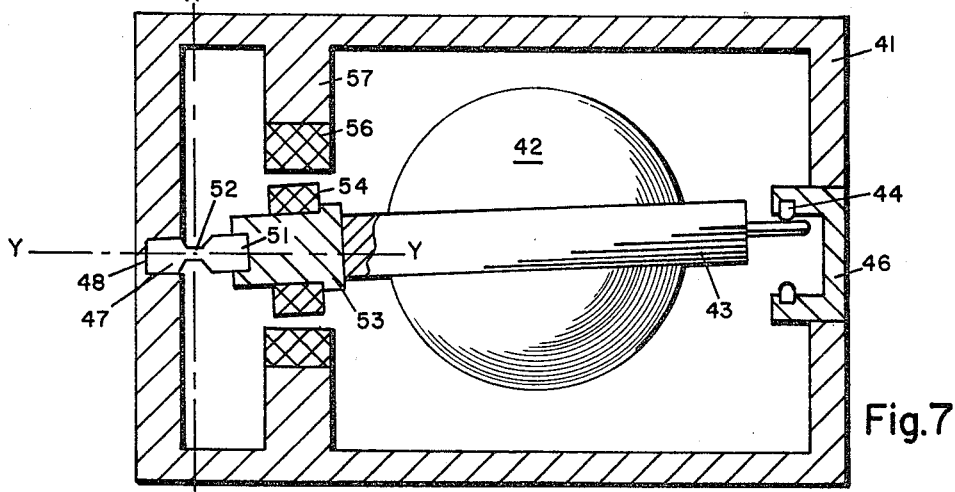
FIGURE 7 shows a cross section of a typical prior art rate gyro suspension system and depicts exaggerated gimbal end play in a direction opposite to that illustrated in FIGURE 6.

Referring now to FIGURE 6 and FIGURE 7, there is shown a typical rate gyro structure of the type currently being used in industry. The showing in FIGURE 6 and FIGURE 7 is of course only schematic.

Referring now specifically to FIGURE 6 there is shown a gyro housing 41. Mounted in the gyro housing for oscillatory movement is a gimbal 43 which has mounted thereon a gyro rotor 42. One end of the gimbal 43 rests in a jewel bearing 44 which in turn is connected by a jewel bearing support 46 to the housing 41. It is again important to note at this time that the schematic showing of the jewel bearing clearance is fantastically exaggerated. This exaggerated tolerance depicted in the jewel bearing has been so placed in the drawing to emphasize the fact that there is a very minute movement within the jewel bearing and because the movement is so small that it would be impossible to detect with the eye, these figures have been drawn so that the movement is greatly exaggerated. It is believed that this exaggerated showing will greatly assist in showing why the prior art rotor support structure is the cause of a gravity sensitive null shift.

The other end of gimbal 43 has mounted thereon a torsion rod 47 which has one end 48 mounted in the gyro housing 41. The other end 51 of the torsion rod is secured to the gimbal 43 and the interconnected pickoff rotor support 53. Mounted on the pickoff rotor support is a pickoff rotor 54 which cooperates with a pickoff stator 56. The pickoff stator 56 is integrally connected to a stator support 57 which in turn forms part of the housing 41.

Of critical importance here is the location of the torsion bar 47 and of specific interest, its central point of flexure 52. As can be readily seen the gyro rotor 42 and interconnected gimbal 43 are principally supported by the torsion bar 47. In view of the fact that the torsion bar is the principal support, any movement of the rate gyro will cause the rotor 42 and associated gimbal 43 and pickoff rotor 54 to oscillate within the area of the pickoff stator 56 within limits of the jewel bearing clearance. This movement may be described in terms of an angular like action about the central point of flexure of the torsion rod 47.

Referring now to FIGURE 7, there will be seen a similar configuration to that depicted in FIGURE 6, wherein the gyro has been schematically shown in a position 180° from that in FIGURE 6, such that the gimbal 43 and associated rotor 42 have now assumed a new position opposite to that depicted in FIGURE 6.

As mentioned before, it will be understood that the gyro shifts from position to position continuously during testing or in actual use. As the gyro is rotated about its output axis through 360° for test purposes, there will be a continual change in the interaction of the flux patterns of the stator flux pattern and the rotor flux pattern. It is this change in the flux linkage that produces a signal which heretofore has remained as a continuing source of error. In order to better understand the serious problem that exists, a study of FIGURES 8, 9 and 10 should be helpful.

Figure 8:
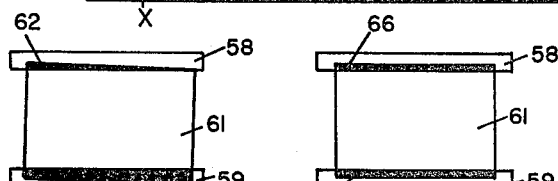
FIGURE 8 illustrates a schematic representation of the interaction of the rotor and stator inductive fields when the gimbal is in the position shown in FIGURE 6.
Figure 10:
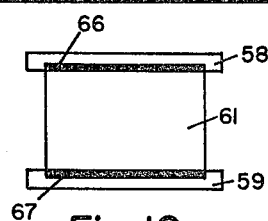
FIGURE 10 illustrates a schematic of the type shown in FIGURE 3 and FIGURE 4 when the gimbal is in an ideal central position.
Figure 9:
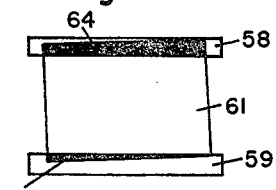
FIGURE 9 illustrates a schematic representation of the interaction of the rotor and stator fields when the gimbal is in the position shown in FIGURE 7.

Referring now to FIGURES 8, 9 and 10, there is disclosed and depicted schematically the interaction of the inductive fields of the gyro pickoff rotor 54 and the gyro pickoff stator element 56. The gyro pickoff rotor inductive field, for example, is schematically indicated by the box 61 in all of the figures. The respective inductive fields of the stator 56 have been schematically indicated by rectangular boxes 58 and 59 in all of these figures.

Referring in particular to FIGURE 8, there is shown for example, the inductive field 61 of the pickoff rotor 54 and the manner in which the pickoff rotor field 61 interacts with the stator fields 58 and 59. FIGURE 8 represents the conditions present when the gyro is in the position depicted in FIGURE 6. It is obvious that the pickoff rotor field 61 interacts with the stator field 59 to the extent indicated by the darkened area 63. Simultaneously, it is seen that the pickoff rotor field 61 is also interacting with the stator field 58 to a much lesser extent as shown by the darkened area 62. It is this inherent difference in the areas 62 and 63 that produces an electro-magnetic unbalance accompanied by a torque which causes rotation of the pickoff rotor in a direction to cause the electro-magnetic unbalance to vanish and thereby obtain a net zero torque. This action produces a change in the pickoff null voltage.

Referring again to FIGURE 9, the interaction of the pickoff rotor inductive field 61 with the stator inductive fields 58 and 59 is shown by the darkened areas 64 and 65. This schematic showing depicts the condition present when the gyro is in the position shown in FIGURE 7. It will again be noted that the darkened areas are unequal in that 64 is larger than 65 and this results in an error signal of the same type present in FIGURE 8, but of opposite direction.

Referring specifically to FIGURE 10, the rotor inductive field 61 is shown in a transitory position somewhere between the condition shown in FIGURE 6 and the condition shown in FIGURE 7. While this position is the ideal position, the gyro inherently never operates at this precise location due to the ever constant force of gravity and the inability of the torsion rod to support the gimbal as a cantilever structure.

While there has been described what are at present considered to be the preferred embodiments of this invention, it will be obvious to those skilled in the art that various changes and modifications may be made therein without departing from the invention, and it is, therefore, aimed in the appended claims to cover all such changes and modifications as fall fairly within the true spirit and scope of the invention.

What is claimed is:
1. A gyroscope comprising,
a rotor,
a gimbal having bearing means for said rotor coincident with its axis of spin,
a housing for said gimbal pivotally supporting it for motion about an axis,
a pickoff stator mounted in said housing,
a pickoff rotor,
said pickoff rotor having a geometrical center about which it rotates,
said pickoff rotor being connected to said gimbal,
a torsion rod,
said torsion rod having its ends respectively connected to said housing and said gimbal and having a central point of flexure,
said central point of flexure being positioned coincident with the geometrical center of said pickoff rotor and within the pickoff rotor.
2. A gyroscope comprising,
a rotor,
a gimbal having bearing means for said rotor coincident with its axis of spin,
a housing for said gimbal having a bearing integral with said housing and supporting a small portion of the total gimbal and rotor weight for pivotal motion about an axis,
a pickoff stator mounted in said housing,
a pickoff rotor,
said pickoff rotor having a geometrical center about which it rotates,
said pickoff rotor being connected to said gimbal,
a torsion rod,
said torsion rod having its ends respectively connected to said housing and said gimbal,
said torsion rod acting as a major support for said pickoff rotor and interconnected gimbal and rotor,
said torsion rod having a central point of flexure,
said central point of flexure being positioned coincident with the geometrical center of said pickoff rotor and within the pickoff rotor.
3. In an inertial guidance device having a reference sensor,
said reference sensor being comprised of a fixed stator means, and
a pickoff rotor means spaced in juxtaposition to said stator means,
said pickoff rotor means being mounted for rotation about an output axis,
said rotor and said stator forming a reference sensor which has a geometrical center point on said output axis,
an input means,
said pickoff rotor being drivingly connected to said input means,
a resilient means,
said resilient element having two end portions one of which is fixedly mounted and the other of which is connected to said input means, said resilient element having a central point of flexure,
said central point of flexure being coincident with said geometrical center point of said reference sensor and within said reference sensor.

4. A rotation sensing device arranged to sense rotation of an object about an output axis, said device comprising:
(a) a rotation sensor including
(1) a stator pickoff element, and
(2) a rotor pickoff element,
(b) said rotor pickoff element being mounted for rotation about said axis with said object,
(c) said sensor providing an output signal indicative of rotation of said rotor element about said axis,
(d) a torsion spring having one end connected to said object and the other end fixed with respect to said stator element,
(e) said torsion spring being disposed to apply torsion against rotation on said axis,
(f) said torsion spring having a central point of flexure on said axis and within said rotor pickoff element,
(g) whereby movement of said object transverse to said axis rotates said rotor element about said point of flexure without net movement of said rotor element transverse to said axis.

5. The combination defined in claim 4 in which
(a) said sensor has a geometrical center point on said axis, and
(b) said point of flexure is coincident with said geometrical center point.

References Cited by the Examiner
UNITED STATES PATENTS

| | | | |
|---|---|---|---|
| 2,837,924 | 6/1958 | Dinter | 74—5.6 |
| 2,847,664 | 8/1958 | Lewis | 74—5.6 X |
| 2,865,206 | 12/1958 | Quermann | 74—5.5 |
| 2,908,168 | 10/1959 | Maynard et al. | 74—5.6 |
| 2,955,471 | 10/1960 | Schwartz et al. | 74—5.5 |
| 2,995,938 | 8/1961 | Brodersen et al. | 74—5 X |

FRED C. MATTERN, Jr., *Primary Examiner.*

BROUGHTON G. DURHAM, *Examiner.*

T. W. SHEAR, P. W. SULLIVAN, *Assistant Examiners.*